May 3, 1955 H. E. BALSIGER ET AL Re. 23,991

CRANK GRINDING MACHINES

Original Filed Aug. 26, 1948 4 Sheets-Sheet 1

Inventor

HAROLD E. BALSIGER
RALPH E. PRICE

By Hugh M. Rocke

Attorney

CRANK GRINDING MACHINES
Original Filed Aug. 26, 1948 4 Sheets-Sheet 2
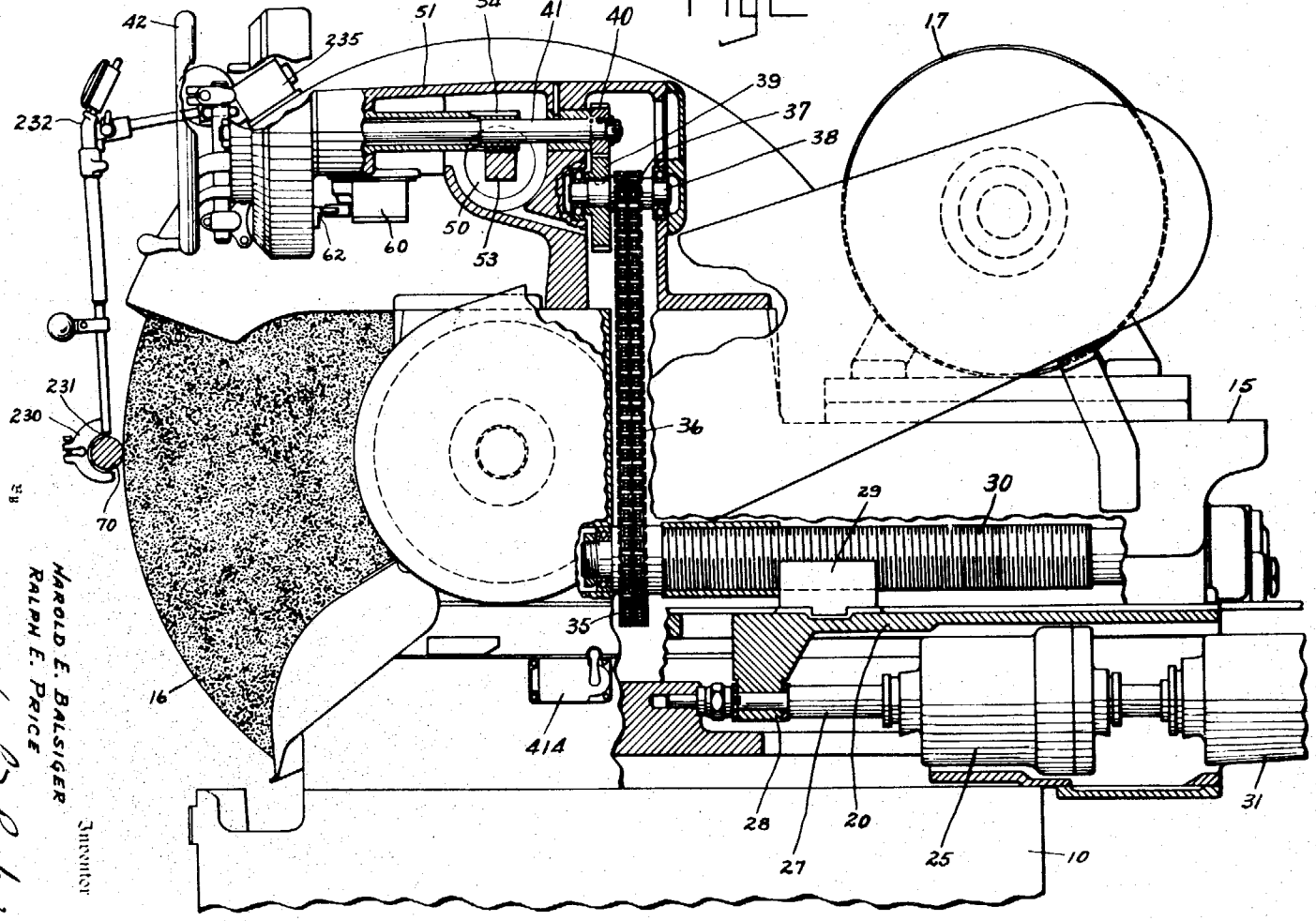
Inventor
HAROLD E. BALSIGER
RALPH E. PRICE
Hugh M. Rocke
Attorney May 3, 1955 H. E. BALSIGER ET AL Re. 23,991
CRANK GRINDING MACHINES
Original Filed Aug. 26, 1948 4 Sheets-Sheet 3
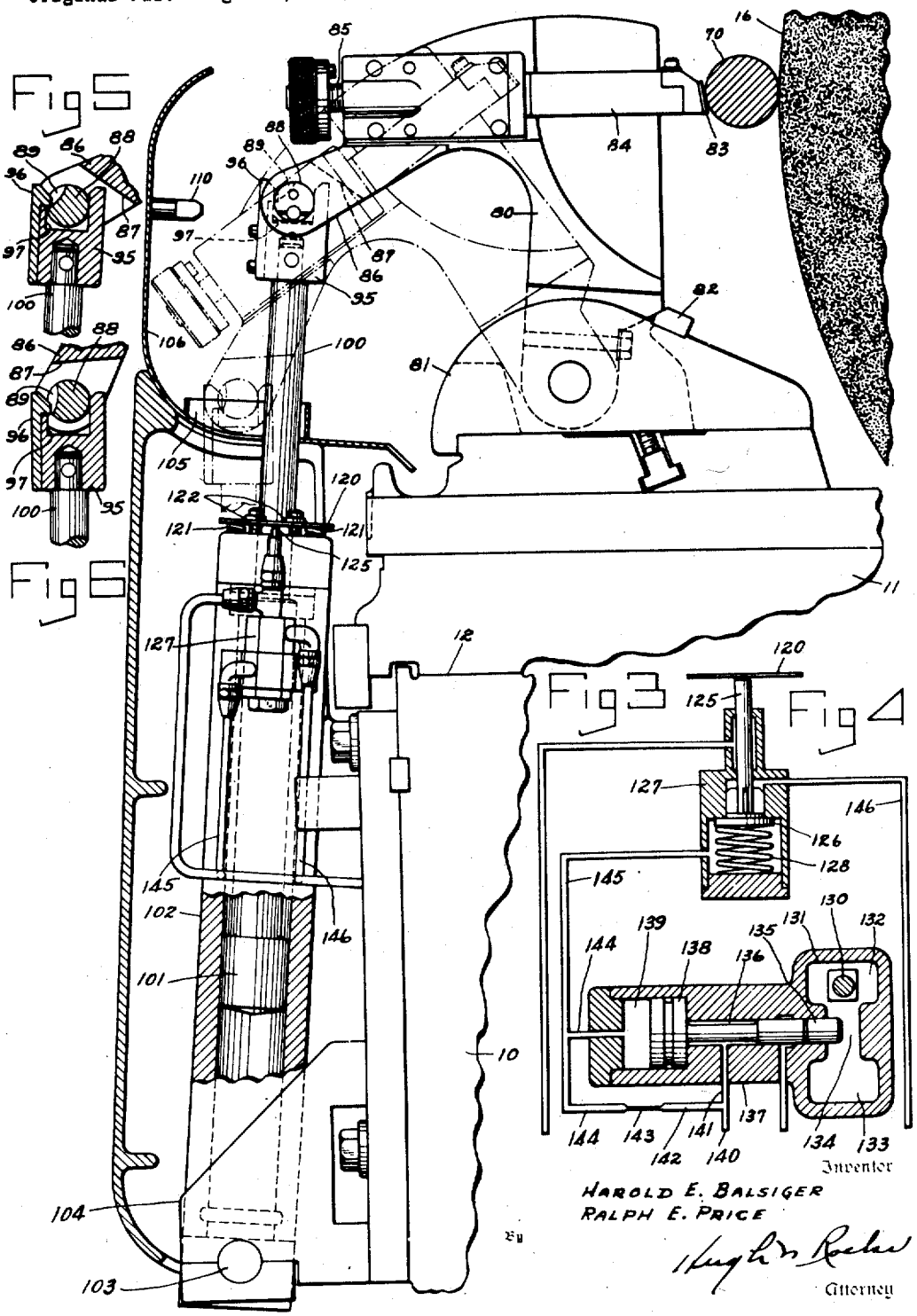
Inventor
HAROLD E. BALSIGER
RALPH E. PRICE
By Hughes Rocke
Attorney May 3, 1955 H. E. BALSIGER ET AL Re. 23,991

CRANK GRINDING MACHINES

Original Filed Aug. 26, 1948 4 Sheets-Sheet 4

Inventor
HAROLD E. BALSIGER
RALPH E. PRICE
By
Hugh M. Rocke
Attorney

United States Patent Office

Re. 23,991
Reissued May 3, 1955

23,991

CRANK GRINDING MACHINES

Harold E. Balsiger, Waynesboro, Pa., and Ralph E. Price, Beloit, Wis., assignors to Landis Tool Company, Waynesboro, Pa.

Original No. 2,638,719, dated May 19, 1953, Serial No. 46,336, August 26, 1948. Application for reissue May 17, 1954, Serial No. 430,468

28 Claims. (Cl. 51—105)

Matter enclosed in heavy brackets [ ] appears in the original patent but forms no part of this reissue specification; matter printed in italics indicates the additions made by reissue.

This invention relates to grinding machines, particularly for grinding crankshafts or other work pieces having axially spaced portions to be ground.

In any grinding operation a *high* degree of accuracy is dependent on two and sometimes three things:

1. Accurate size control.
2. Accurate feed mechanism.
3. Accurate means for supporting the work piece, particularly in grinding axially spaced surfaces on a work piece.

A fourth requirement might be the skillful use of all of these so as to get the best results.

We prefer to use a sizing device of the so-called pneumatic type, the most recent development of which is disclosed in co-pending application Ser. No. 773,388, filed September 11, 1947 *now Patent 2,567,360 granted September 11, 1951.* However, while this is probably the most accurate sizing device available, accurate size control is dependent on an accurate feed mechanism. It was formerly thought that the slower the finish feed, the more accurate the final size. This slow feed was also supposed to permit relief of deflection in the work and in the machine. However, there was found to be a mechanical or frictional limitation to extremely slow feeding movements beyond which it was impractical to go.

It was found that by keeping the slow feed within a range not affected by these limitations, [that] inaccuracy due to lack of uniformity of feed rate can be eliminated. In addition to this, the entire feeding movement is divided into a series of successive size controlled reductions in feed rate. The purpose of this is not to eliminate deflection entirely, but to reduce it to a minimum which can be relieved during a brief size controlled spark out operation.

One of the principal obstacles to accuracy in any machining operation is deflection or distortion. This may occur in varying degree in the work, in the machine itself, or in both. It is the result of resilience of the work piece and the machine. These parts, therefore, yield or deflect when forced together by the feeding mechanism. In the case of grinding, distortion or deflection of the work may be counteracted by use of a back rest.

*Another obstacle to accuracy is "run-out" of the work piece, that is, the center of the work piece and the center of rotation do not co-incide. A work piece which is off center or runs-out may be perfectly round. In order to correct "run-out" the work piece is rough ground without a steady rest and is caused to deflect by both the feeding movement and the "run-out." At a predetermined point, the wheel feed is stopped and the work springs back toward the wheel continuing the grinding operation until the spring in the work is relieved. When so ground, only the side which runs out is subjected to the grinding wheel at first. As the "run-out" is reduced the center of the work approaches the center of rotation until the two co-incide, the entire periphery of the workpiece is subjected to the grinding wheel and the "run-out" is eliminated.*

Deflection in machine parts *and "run-out" of the work piece* may be compensated for by stopping *of* the feeding mechanism for the grinding wheel and permitting the deflected parts [and], assemblies *and the work piece* to relieve themselves and, in so doing, to provide a spark out grinding operation. The term spark out may be defined as a relative feeding movement between a grinding wheel and a work piece occurring after the feed mechanism has stopped, which is due to the relief of stresses in the work or machine or both. These stresses are built up during that portion of the grinding operation when the feed mechanism is operating.

The current method of supporting crank pins during grinding is to use a single steady rest mounted on the bed of the machine and in alignment with the grinding wheel. This rest moves by power into position against a positive stop, usually as soon as the work has been ground true, and is held against said stop while the operator adjusts the position of the shoe or shoes as the work is reduced in size. The adjustment required for each pin on a shaft is usually different due to unequal deflection at various points on the shaft, and thus the steady rest must be adjusted differently for the grinding of each pin. Usually the final increment of stock is removed by [using] *use of* this adjustment to feed the work against the wheel. This takes quite a bit of time, and uniformity of adjustment by the operator cannot be guaranteed.

We propose to use a separate steady rest for each crank pin. Each rest will be movable into work supporting position only when the pin which it is to support is in front of the grinding wheel. Each rest will be preadjusted to the particular pin which it is to support; i. e. when the rest engages its positive stop, it is located to support that particular pin in finished size position. When moved into working position, the rest will engage the work continuously until it is also engages a positive stop. When the rest engages the stop, it is deflecting work toward wheel by a small amount. As the wheel feeds forward and the stock is removed, the work maintains contact with the rest; and as the work diameter is reduced, the axis of the pin coincides with the axis of rotation of the shaft. The adjustment of each rest should be such that, when the sizing device stops the grinding operation, the rest still exerts enough pressure on the work to prevent chatter. At the end of this operation which is controlled by the sizing device the work should be round and straight and about .0005 oversize.

The grinding operation will be stopped and the feed mechanism reset either after a predetermined interval or by the sizing device when the .0005 stock has been removed.

It is, therefore, an object of this invention to provide a machine for grinding crank shafts to closer limits than has been possible with previous machines.

A further object is to provide a separate, accurately adjusted steady rest for each of the pins of a crank shaft.

A further object is to interlock the control of the steady rest and the feeding mechanism.

A further object is to prevent movement of any steady rest except the one for the portion of the shaft in grinding position.

*A further object is to control the feeding mechanism so as to correct "run-out" of the work piece by stopping the feed mechanism during rough grinding and starting it again after a predetermined interval.*

In the drawings:

Fig. 2 is an end elevation partly in section.

Fig. 3 is an end elevation to the steady rest operating mechanism partly in section.

Figure 4 is a hydraulic diagram of a safety feature of the machine.

Figure 5 is a sectional elevation showing the relation of work rest parts in operative position.

Figure 6 shows the same parts in inoperative position.

Figure 1:
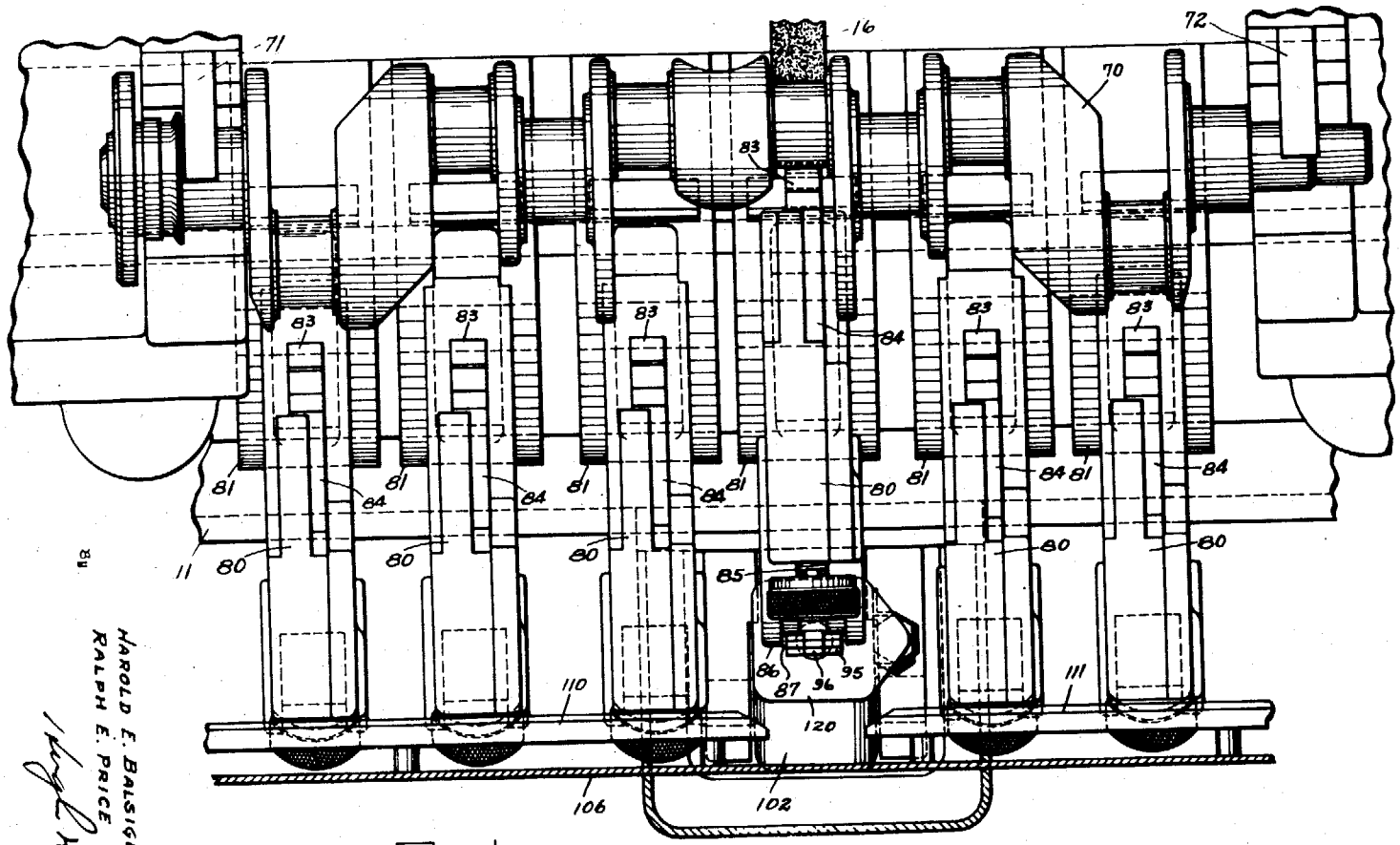
Fig. 1 is a partial plan view.
Figure 7:
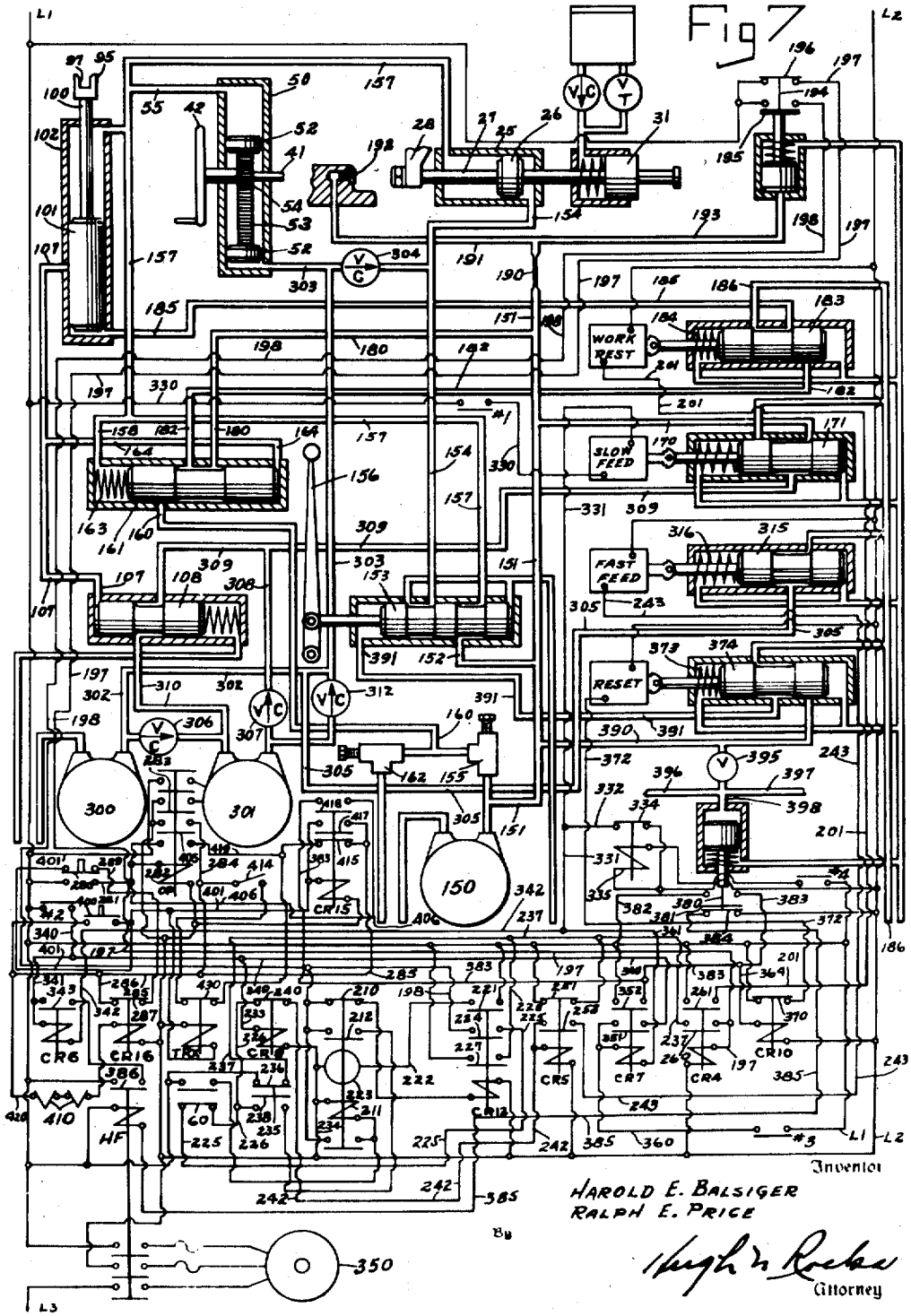
Figure 7 is a hydraulic and electrical diagram.

The bed of the machine is indicated by numeral 10; the work carriage slidably mounted thereon, by the numeral 11. Said carriage is supported on a V and a flat guide. Only the flat guide 12 is shown. Said carriage may be moved manually or by power by any of several well-known mechanisms.

The wheel base 15 is slidably mounted on bed 10 for movement in a direction transversely of the carriage movement. A grinding wheel 16 is rotatably mounted on said base and driven by a motor 17 through a belt drive not shown. Said wheel base is slidably mounted on an intermediate slide 20, which in turn is slidably mounted on bed 10.

WHEEL FEED

The means for moving wheel base 15 toward and from the work consists of a hydraulic motor comprising a cylinder 25 mounted on bed 10, a piston 26 slidably mounted therein and having a piston rod 27 connected to slide 20 through lug 28. The dash pot mechanism 31 for controlling the feed movement is well-known and will not be described here. A half nut 29 on slide 20 engages a feed screw 30 rotatably mounted in wheel base 15. Thus slide 20 and base 15 may be moved as a unit or base 15 may be moved relative to slide 20 by *rotation of* [rotating] feed screw 30.

Means for rotating feed screw 30 consists of a sprocket 35 secured to one end of said screw, a chain 36 connecting said sprocket with another sprocket 37 on shaft 38 in the upper part of the base 15. Also mounted on said shaft 38 is a gear 39 meshing with gear 40 on handwheel shaft 41. A handwheel 42 provides means for manually feeding base 15 along side 20.

Handwheel 42 may be power actuated by means consisting of a cylinder 50 forming part of the housing 51 of said manual feed mechanism, having a double-headed piston 52 slidably mounted therein. Said piston consists of two heads joined by a rack 53. Said rack engages a pinion 54 on handwheel shaft 41.

A limit switch 60 on the underside of housing 51 is positioned to be actuated by a cam 62 on handwheel 42. This switch, when actuated, controls the movement of piston 52 as will be described later.

A work piece 70 in the form of a six throw crank shaft is rotatably supported on carriage 11 in hydraulic clamping fixtures 71 and 72 on headstocks not shown. The details of the clamping fixtures and headstocks as well as other details of machine structure are similar to those shown in Patent 2,220,490, granted November 5, 1940.

STEADY REST

A separate steady rest member is provided for each of the six crank pins on crank 70. Each steady rest consists of a main frame member 80, pivotally mounted in a base member 81 common to all six rests. Hereafter, the numeral 80 will be used in referring to the steady rest as a unit. The movement of each rest toward the work piece is limited by a stop 82 located on base 81 in the path of movement of said frame 80. The work engaging member is preferably a hardened shoe 83, removably mounted on a support member 84. Said support member is slidably mounted in said frame 80 and may be adjusted by means of screw 85. A tail portion 86 on said frame is slotted at 87 to permit engagement with a cooperating portion 95 on an actuating member to be described later. A stub shaft 88 extends across the slotted portion of said tail. Said shaft has a shallow transverse slot 89 which is engaged by a latch 96 forming one side of a recess 97 in said portion 95.

Portion 95 is secured to the end of a piston rod 100 on piston 101. Said piston is slidably mounted in cylinder 102, which in turn is pivotally mounted at 103 on a bracket 104 attached to bed 10 so they move in accordance with the pivotal movement of the steady rest 80. Said piston rod extends upwardly through an opening 105 in a splash guard 106[,]. *Said guard is attached to a cover plate 109 which in turn is mounted on bed 10,* which extends the entire length of the work piece. Across the inside of said *guard and attached thereto* [shield], a pair of longitudinally spaced bars 110 and 111 are placed. The bars are so located that the space between them is directly in line with the grinding wheel *as shown in Figure 1.* Said space is wide enough to permit the passage therethrough of the knob on adjusting screw 85. When the rests are in inoperative position, said bars prevent movement of all *toward the work* except the one in line with the grinding wheel.

On top of cylinder 102 is a plate 120 urged upwardly by springs 121 against adjustable stops in the form of headed screws 122. When piston 101 moves to bottom position, the portion 95 engages and depresses said plate which in turn depresses a valve stem 125. As shown in Figure 4, stem 125 is part of valve 126 slidably mounted in housing 127. A spring 128 holds valve 126 in closed position.

SINGLE CONTROL LEVER

Most of the functions of this machine are controlled by means of a single lever 130 *shown in Figure 4.* The positions of said lever for controlling said functions are indicated on a guide plate 131 having a pair of parallel slots 132 and 133 joined by a connecting slot 134. In the position shown in slot 132, it controls the rotation and clamping of the work. In slot 133 it controls the traverse movement of carriage 11.

As a safety feature, movement of lever 130 from slot 132 to slot 133 may be prevented by blocking the connecting slot 134. The means for doing this consists of a plunger 135 in a bore 136 in a housing 137 which may or may not be integral with plate 131. Said plunger is actuated by a piston 138 slidably mounted in a cylinder 139 in housing 137. The portion of plunger 135 adjacent piston 138 is reduced in diameter so that fluid under constant pressure may be directed to the rod end of cylinder 139.

Fluid under constant pressure from line 140 is directed through line 141 to the rod end of cylinder 139 and through line 142, a restriction 143 and line 144 to the head of said cylinder. Line 145 connects line 144 with valve housing 127. When valve 126 is closed, fluid under the same pressure is directed to both sides of piston 138. Because of the difference in area of the opposite sides of said piston, it moves to the right so that plunger 135 is projected into connecting slot 134. When valve 126 is opened, line 145 is connected to exhaust line 146. Pressure on the head end of piston 138 is reduced to exhaust pressure. Restriction 143 prevents a similar reduction in pressure on the rod end of said piston which then moves to the left, withdrawing plunger 135 from slot 134. The function of this lever 130 and plate 131 is shown and described more in detail in said Patent No. 2,220,490.

In the patent the piston corresponding to 136 is actuated against a spring by the fluid which moves the wheel base forward, to project plunger 135 into the connecting slot so that the control lever cannot be moved out of clamp operating position while the wheel is forward. When the wheel is moved back, the pressure on the piston is released and the plunger is withdrawn by said spring.

Start switch and circuits operated *by said switch* [thereby]

Before *initiation of* [initiating] the feed movement certain conditions exist in the electrical and hydraulic circuits as a result of operation of start switch 280. Furthermore, with the sizing device caliper in inoperative position, there is a complete restriction of air flow; and the resulting pressure causes the mercury to close all four size contacts. *All relays are shown de-energized. When energized, the arms move to the opposite position.*

Closing start switch 280 completes a circuit through line 281 to oil pump relay 282, closing the contacts thereof and starting the oil pump 150 and also slow feed oil pumps 300 and 301. These pumps are all driven by the same motor. At the same time, said switch opens a normally closed circuit to CR15 through contact 287 of CR16.

When CR15 is deenergized, current for all apparatus except the oil pump passes through contact 418, closing contact 283 on oil pump relay 282 (hereafter referred to as O. P.), and completes a circuit through lines 284, 285, 420 and switch 410 to energize CR16 and open contact 287. Thus, the circuit to CR15 is also opened through said contact 287; and when start switch 280 is released to close the circuit through line 289 to contact 287, said contact is open, and energization of CR15 is prevented.

Contact 283 through line 284 also acts through line 285 and normally closed contact 415 of CR15 and line 419 to contact 405 of O. P. and thus holds O. P. after release of switch 280.

JET OPERATED PRESSURE SWITCH

Normally closed contact 196 of jet pressure switch 194 connects $L_1$ and line 197 to energize relay CR4. Contact 261 of CR4 acts through line 201 to energize the work rest solenoid and move valve 183 to the left against spring 184. In this position said valve connects line 185 leading to the lower end of work rest cylinder 102 with exhaust line 186. CR4 is held through its contact 260, line 237 and the normally closed contact 251 of CR5 and also through the normally closed contact 236 of gauge limit switch 235.

SIZE CONTROL

An air operated sizing device of the type shown in copending application Serial No. 773,388, filed September 11, 1947, is mounted for movement toward and from operative relation with the work. It consists of a caliper element 230 having two fixed feelers and one movable feeler 231. One end of the movable feeler engages an air valve 232 and controls the flow of air in accordance with change in the diameter of the work piece. The change in air pressure is used to change the level in a mercury U tube of the type shown in Patent No. 2,220,470, granted November 5, 1940, except that in this case there are four contacts instead of two. Rather than repeat the drawing of the above-mentioned patent, we merely indicate these contacts in the conventional manner in the wiring diagram and identify them by the numerals 1, 2, 3 and 4. When the caliper 230 is in inoperative position, the movable feeler 231, not being restrained by the surface of a work piece, permits air valve 232 to move to a closed position. Air pressure is thus built up in the mercury switch (not shown), and all four contacts remain closed until the caliper is placed on the work. Then feeler 231 is moved by contact with the work to open valve 232; and as the pressure drops, all four contacts are opened.

Time delay relay 335 energized through #4 sizing device contact holds normally closed contact 334 open for a predetermined interval and thus prevents a complete circuit to any of the other sizing device contacts after the caliper is returned to engagement with the work piece and until the sizing device contacts are opened by the mercury column. If these contacts were not temporarily dead, 334 would permit a complete circuit from sizing contact #3 which would operate the reset valve and move the wheel base to inoperative position instead of continuing the feeding movement.

Movement of caliper 230 toward and from operative position is used to actuate a limit switch 235, the function of which will be described later.

NORMALLY CLOSED SIZING DEVICE CONTACTS

While caliper 230 is out of contact with a work piece, air pressure builds up in the mercury switch and closes all four contacts.

Contact #1 completes a circuit from $L_1$ to one side of the slow feed solenoid through line 330. Line 231 connects the other side of said solenoid through line 332 to normally closed contact 334 of delay relay 335.

Contact #2 closes a circuit from $L_1$ through lines 340 and 341 to CR6 and through lines 342, 331 and 332 to normally closed contact 334 of delay relay 335. Delay relay 335 is energized from contact #4. Thus, contact 334 remains open and CR6 and the slow feed solenoid remain deenergized.

Line 340 from contact #2 leads to a normally open contact 351 of CR7. Line 340 is also connected to CR9 through line 233. The other side of CR9 is connected to $L_2$ through line 234.

Contact #3 connects $L_1$ through line 360 to CR7 and through lines 361, 331 and 332 to contact 334 of delay relay 335. CR7 remains deenergized because contact 334 is open at this time.

WORK CLAMP AND WHEEL FEED INTERLOCK

Before [bringing] the grinding wheel *is brought* forward, the work must be held securely by the clamping fixtures. So long as there is no pressure on the clamping fixtures, pressure switch 380 has a normally closed contact 381 which completes a circuit from $L_1$ through line 382, contact 381 and lines 383 and 364 to energize CR10. When CR10 is energized, its normally closed contact 370 is opened; and the circuit through line 372 to the reset solenoid is broken, deenergizing said solenoid and permitting spring 373 to shift valve to the right. In this position valve 374 directs fluid under pressure from lines 151 and 390 through line 391 to the left end of feed control valve 153, thus preventing the shifting of said valve to advance wheel 16 while the work clamps are open.

CLAMPS HYDRAULIC AND ELECTRIC CIRCUITS

When valve 395 is opened by lever 130, fluid under pressure from line 390 may pass through lines 396 and 397 to the work clamping fixtures 71 and 72. Said fluid also passes through line 398 to actuate pressure switch 380. When so actuated said switch opens contact 381, deenergizing CR10, closing contact 370 and energizing the reset solenoid so that valve 374 moves to the left to connect line 391 with exhaust, thus relieving pressure at the front end of valve 153. It also closes contact 384 which completes a circuit from $L_2$ through line 385 and manually operated headstock starting limit switch (not shown) to energize HF which starts motor 350. HF has an additional normally open contact 386 which is closed at this time. Contact 386 connects $L_1$ with one side of open contact 343 of CR6.

HYDRAULIC FEED RAPID

Fluid under pressure is supplied to feed cylinder 25 by a constant volume pump 150 through lines 151 and 152, reversing valve 153 and line 154 at a pressure determined by relief valve 155. Fluid under pressure from relief valve 155 passes through line 160 to valve 161 at a pressure determined by relief valve 162. Said valve 161 is pressure operated from right to left against a spring 163.

Fluid under pressure from line 151 is also directed through line 170 to the slow feed solenoid valve 171 and through line 180 to valve 161. Said valve thus has two sources of fluid under pressure at two different pressures. Fluid at either pressure is directed through line 182 to work rest solenoid valve 183. The only reason for the high pressure is to move the work rest into position rapidly. The change to low pressure reduces the impact of the rest against the stop 82 or the work. The low pressure is sufficient to support the work during grinding.

Fluid from line 151 passes through a restriction 190 and through line 191 to a nozzle 192 from which the fluid is discharged as a jet against the end of piston rod 27. When piston rod 27 approaches nozzle 192 closely enough to reduce the flow therefrom, the resulting pressure acts through line 193 to actuate pressure operated switch 194.

GRINDING FEED

Fluid under pressure for the pin grinding feed is supplied by differential pumps 300 and 301, the capacity of pump 300 being slightly greater than that of pump 301 or it may be of the same capacity and operated at a slightly higher speed.

Pump 300 is connected through lines 302 and 303 to one end of feed cylinder 50 and through check valve 304 to line 154 for exhaust. Line 302 is connected by line 305 to fast feed valve 315. Pump 300 is also connected through check valve 306 to the intake of pump 301. When valve 315 is open to exhaust, that portion of the output of pump 300 not taken by pump 301 is discharged to exhaust.

Pump 301 is connected through check valve 307, line 308 and line 309 to valve 108, and line 310 back to the pump. Line 309 is extended to slow feed valve 171. Line 170 connects valve 171 with high pressure line 151. Said pump 301 is also connected through check valve 312 to line 303.

So long as valves 108 and 171 are in the position shown, pump 301 will receive its supply entirely from high pressure line 151 through valve 171 and line 309. This higher pressure will hold check valve 307 closed. Said pump will be supplied from line 309 through valve 108 and line 310. The high pressure in line 310 closes check valve 306 so that the entire output of pump 300 passes through line 302 where it is added to the entire output of pump 301 and passes through check valve 312 so that the combined output of both pumps acts on piston 52.

When valve 108 is shifted to the right, pump 301 receives its entire supply from pump 300. The remaining output of pump 300 passes through line 302 to line 303, while the output of pump 301 passes through check valve 312 to line 303 since check valve 307 is still held closed by the high pressure in line 309. Although both pumps *feed* [pump] into line 303, the volume passing through said line is in effect the equivalent of the output of pump 300 only.

When slow feed valve 171 is shifted to exhaust position, the entire output of pump 301 is exhausted through lines 308 and 309. Under these conditions the only fluid under pressure remaining to actuate piston 52 is the small volume by which the output of pump 300 exceeds that of pump 301.

MASTER STOP SWITCH AND OVERLOAD SHUT OFF

The entire machine may be stopped with the wheel base in inoperative position either by master stop switch 400 or by overload relays 410. For this purpose said stop switch may be connected to $L_1$ through any or all of three circuits.

(a) From stop switch 400 through lines 285, 286, contact 287 of CR16, normally closed contact of start switch 280, contact 405 of O. P., line 419 contact 430 of TRX, wheelbase limit switch 414, and contact 283 of O. P. to $L_1$.

(b) From stop switch 400 through lines 285, 284, contact 283 of O. P. to $L_1$.

(c) From stop switch 400 through lines 285, contact 415 of CR15, contact 430 of TRX, wheelbase limit switch 414, line 284, and contact 283 of O. P. to $L_1$.

The wheel base limit switch 414 is closed when the wheel base moves forward and serves to hold O. P. energized after operation of either stop switch 400 or overload 410 to keep the oil pump 150 operating until wheel base 15 moves to inoperative position, when said switch is released and the oil pump stops.

Closing stop switch 400 connects $L_1$ through any of the above-mentioned paths through line 401 to energize CR15, opening contact 415 and closing contacts 417 and 418.

Opening overload relays 410 will deenergize CR16, closing [normally closed] 287 and connecting $L_1$ through normally closed switch 280, lines 289 and 401 to energize CR15.

Opening normally closed 415 breaks the circuit to start switch 280. Closing 417 holds CR15 through 283 of O. P. and lines 284 and 285. Closing 418 connects $L_1$ from contact 405 of O. P. through line 406 and from 418 through line 383 to energize CR10 which deenergizes reset solenoid, causing wheel base 15 to move to inoperative position and open switch 414.

Opening limit switch 414 serves to stop not only the oil pump 150 but also all other motors on the machine, such as the work 350 and wheel drive motors. Although the circuits for these motors are not shown, they are similar to that for the oil pump. Regardless of how many motors are stopped, the principal feature of the method of stopping lies in the fact that the oil pump 150 is kept in operation until the wheel has been moved away from the work and thus provides the motive power for effecting the back off movement.

If for any reason the hydraulic system should fail through leakage or otherwise, the wheel base could not be moved to inoperative position and the machine would keep running. In order to insure the shutting off of the machine, a timing relay TRX is placed in parallel with CR15 and the contact 430 of TRX in series with the wheel base limit switch 414. Said relay will be energized simultaneously with CR15 and will function to open the same circuit or limit switch 414 at a predetermined time thereafter.

*Operation*

To initiate the feeding movement of grinding wheel 16, the operator shifts valve 153 to the left by means of lever 156, thus directing fluid from line 152 through line 154 to the right hand end of cylinder 25. Piston 26 in said cylinder moves to the left, thus moving slide 20 and wheel base 15 rapidly to position grinding wheel 16 in operative relation to one of the crank pins on crankshaft 70. As wheel 16 reaches the portion of the crank 71 known as the cheek, the rapid movement is reduced by dash pot 31 to a speed suitable for cheek grinding *which is effected by the sides of the wheel.* The feeding movement continues at this rate until the flow of fluid from nozzle 192 is reduced or stopped by the end of piston rod 27.

When valve 153 moves to the left, line 157 is connected to the exhaust passage from said valve. This line is connected through line 158 to the left end of valve 161. Line 157 is continued to the upper end of cylinder 102 and through line 55 to the upper end of cylinder 50. Line 157 is connected directly to the left end of feed cylinder 25.

When the upper end of cylinder 102 is connected to exhaust, the pressure on plate 120, *Figure 4*, is released and said plate, being then lifted by springs 121, releases valve 126 which is then moved to closed position by spring 128. Fluid under pressure from line 140 due to restriction 143 has been acting through line 141 to hold piston 138 in the left hand position. With the closing of valve 126, fluid from restriction 143 builds up pressure in line 144 and against the head end of piston 138. Because of the greater surface at the head end, said piston is moved to the right and plunger 135 blocks slot 134, lever 130 having been moved into slot 132 to actuate the work clamping fixtures and start rotation thereof before the initiation of said feeding movement.

Pressure built up in lines 191 and 193 as a result of blocking the escape of fluid from nozzle 192 actuates pressure switch 194 to close contact 195 thereon and open contact 196. Opening contact 196 opens a circuit through line 197 to relay coil CR4 which is held through contact 251 of CR5, contact 227 of CR12 which depends on normally closed timer contact 210 and normally closed gauge limit switch contact 236. Thus, the opening of contact 196 has no immediate effect on CR4.

Contact 195 directs current from line 1 through line 198 and the normally closed contact 210 of timer clutch relay 211 to energize relay CR12. Contact 221 of said relay CR12 then completes a circuit through line 222 to start timer motor 223.

Contact 224 of CR12 completes a circuit from contact 195 on pressure switch 194 through line 225, [pin feed] limit switch 60 *actuated by cam 62 on handwheel 42*, line 226, contact 240 of CR9 which is energized through size device contact 2 so long as the caliper 230 is in inoperative position. The circuit is completed through line 242 to relay CR5 opening contact 251 and closing contact 252. Opening contact 251 removes one source of energization to relay coil CR4 through line 237 and holding circuit contact 260. However, the holding circuit is still completed from $L_1$ through the normally closed contact 236 of gauge limit switch 235 and line 237. Said holding circuit is also maintained by the third contact 227 of CR12. Said contact is connected through line 228 to line 237. Thus, caliper 230 may be made to engage the work at any time; but opening contact 236 thereby will not deenergize relay CR4 and the work rest solenoid until CR12 is deenergized, CR5 has been energized, and current cut off from all sources to relay CR4.

CR12 is not deenergized until timer 223 functions at the end of a predetermined period, beginning with the actuation of jet operated pressure switch 194.

WORK REST

The opening of contact 236 by movement of the gauge limit switch 235 in response to the positioning movement of caliper 230 to engage the work piece will deenergize relay CR4 if CR12 is already deenergized, opening the circuit from $L_1$ through contact 261 and line 201 to deenergize the work rest solenoid. Spring 184 will then shift valve 183 to the right, connecting pressure line 182 from valve 161 to line 185, leading to the lower end of work rest cylinder 102, and moving piston 101 rapidly upwardly so that work rest engaging member 95 may engage and shift work rest 80 into operative relation with work piece 70. It should be noted that fluid under pressure for operating the work rest at this time comes to valve 161 from pump 150 through high pressure line 151 and line 180. As piston 101 moves upwardly, it uncovers a port leading to line 107 which in turn is connected through line 164 to the right end of valve 161. Said valve then moves to the left against spring 163 and changes the source of fluid from high pressure lines 151 to 180 to low pressure line 160. Thus, the work rest is moved rapidly into position at high pressure and held in working position by a lower pressure.

Line 107 also leads to the left end of a slow feed bypass valve 108, which will be described later in connection with associated elements.

The above operation of the work rest takes place only after the expiration of the timed period. Prior to that time, contact 252 of relay CR5 completes another circuit from line 242 through line 243 to energize the fast feed solenoid and shift valve 315 to the left against spring 316.

When fast feed valve 315 is in this position, it blocks the exhaust of fluid from line 305 and pumps 300 and 301. Since pump 301 is at this time receiving its supply from pump 150 and lines 309 and 310 as described above, check valve 306 is held closed by the higher pressure; and the total output of the two pumps 300 and 301 is directed to feed cylinder 50 to effect a rough grinding feed. This feed is for grinding the crank pins round. This feeding movement continues until cam 62 on handwheel 42 actuates limit switch 60. Opening one contact of switch 60 deenergizes CR5, closing 251 and opening 252. Closing the other contact of switch 60 energizes the timer clutch to start the timed period.

Opening 252 deenergizes the fast feed solenoid, and valve 315 is shifted to open line 305 to exhaust thus bypassing the output of pumps 300 and 301 to stop a rough feed movement of feed piston 52.

Feed is resumed after the period for which timer 223 is set, but only if caliper 230 is in engagement with the work piece. Operation of the timer opens contact 210 and closes 212. Moving the caliper into engagement with the work opens contacts 236 and closes 238.

Opening timer contact 210 deenergizes CR12 to stop the timer 223. Closing contact 212 closes a circuit from $L_1$ through line 198 to contact 238 of gauge limit switch 235.

Closing contact 238 energizes CR5 which closes 252 to energize fast feed solenoid and shift valve 315 to cut off exhaust from line 305.

All circuits to CR4 are opened, including contacts 236 of gauge limit switch 235, 227 of CR12 and 251 of CR5.

Shifting valve 108 to the right cuts off the supply of high pressure fluid from line 309 to pump 301. Pump 301 then pumps from pump 300 through check valve 306 and from the pump through check valve 312 to line 303. Pump 300 pumps through line 302 an amount equal to the difference in capacity of the two pumps. This provides a second feed rate for a rough grinding operation for quick reduction to approximate finished size.

Feed continues at second rate until work size causes first contact of the sizing device to function.

#1 sizing device contact energizes the slow feed solenoid to shift valve 171 to change line 309 from high pressure to exhaust so that the output of pump 301 passes through check valve 307 to exhaust, leaving only the small volume which is the difference between the capacities of the two pumps to continue driving feed piston 52 at a third feed rate. This feed rate is for a finish grinding operation.

As the work is reduced in size, sizing device contact #2 energizes CR6 through lines 340 and 341 and CR9 through lines 340 and 233. CR6 is held through contact 386 of H. F. CR9 opens 240 to deenergize CR5. Sizing device contact #2 also prepares a holding circuit for CR7 when CR7 is energized by sizing device contact #3.

When CR5 is deenergized, it opens contact 252 to deenergize the fast feed valve 315 to exhaust pumps 300 and 301 to stop the feed movement of piston 52.

After the feed movement stops, the grinding wheel remains in contact with the work to effect a polishing operation which includes a slight additional removal of stock, the extent of which is determined by sizing device contact #3.

When sizing device contact #3 is closed, it energizes CR7 closing contacts 351 and 352. 351 provides a holding circuit which includes sizing device #2. 352 energizes CR10 which completes circuits to normally closed 381 of hydraulic clamp limit switch 380.

CR10, when energized, opens contact 370 to deenergize the reset solenoid. Spring 373 shifts valve 374 to connect high pressure line 390 from 151 to 391 to shift valve 153 to reset position. In this position of valve 153, fluid under pressure is directed to effect a reversal of feed pistons 26 and 52 and work rest piston 101 to return them to starting position.

We claim:

1. A grinding machine including a bed, a work support and a grinding wheel support slidably mounted thereon for movement toward and from said work support, means for successively supporting a series of spaced portions on a work piece during a grinding operation including a separate steady rest for each portion, means for moving each of said rests into operative position when the corresponding work portion is in position to be ground, a calipering device movable toward and from operative position relative to the portion to be ground and means responsive to movement of the calipering device into operative position for causing said moving means to move the steady rest corresponding to the portion being ground to move into work supporting position.

2. A grinding machine including a bed, a work support and a grinding wheel support slidably mounted thereon, a grinding wheel rotatably mounted in said support, said work support being slidably mounted for movement longitudinally relative to said grinding wheel, means on said work support for successively supporting a series of spaced portions on a work piece including a separate steady rest for each portion and a single hydraulic motor mounted on the bed substantially in alignment with the grinding wheel for moving the proper steady rest into operative relation with the work.

3. A grinding machine including a bed, a work support and a grinding wheel support slidably mounted thereon, said work support being slidably mounted for movement longitudinally relative to said grinding wheel, means for successively supporting a series of spaced portions on a work piece during a grinding operation including a separate steady rest for each portion, means for effecting said longitudinal movement intermittently to position said portions in operative relation with said grinding wheel, and means including a common motor for causing the steady rest corresponding to the portion being ground to move into work supporting position.

4. In a grinding machine, a bed, a grinding wheel support slidably mounted thereon, a work support slidably mounted thereon, means to effect a relative longitudinal movement of said supports for successively placing a series of axially spaced portions on a work piece in operative relation with said grinding wheel, a plurality of steady rest members on said work support in fixed axial relation to said spaced portions and a single work rest actuating device in fixed axial relation with said grinding wheel for actuating the rest corresponding to the work portion which is in operative relation with the grinding wheel.

5. A grinding machine, a bed, a grinding wheel support slidably mounted thereon, a work support slidably mounted thereon for longitudinal movement relative to said wheel support for successively placing a series of axially spaced portions on a work piece in operative relation with said grinding wheel, a plurality of steady rest members on said work support in fixed axial relation to said spaced portions and means to hold all of said rests in inoperative position except the one in front of the grinding wheel including an obstruction in the path of each of said inoperative rests.

6. In a grinding machine, a bed, a grinding wheel support slidably mounted thereon, a work support slidably mounted thereon, means to effect a relative longitudinal movement of said supports for successively placing a series of axially spaced portions on a work piece in operative relation with said grinding wheel, a plurality of steady rest members on said work support in fixed axial relation to said spaced portions and means to prevent movement of any of said rests except the one in front of the grinding wheel including a pair of longitudinally fixed bars positioned to obstruct movement of said rests, said bars being longitudinally spaced to permit one rest to be moved to operative position.

7. A grinding machine including a bed, a work support and a grinding wheel support slidably mounted thereon for movement toward and from said work support, means on said work support for successively supporting a series of spaced portions on a work piece during a grinding operation including a separate steady rest for each portion, a single actuating means for steady rests, a timing mechanism and means for starting same at a predetermined point in the grinding operation, and means actuated by said timer for causing said actuating means to move the steady rest corresponding to the portion being ground into work supporting position.

8. A grinding machine including a bed, a work support and a grinding wheel support slidably mounted thereon for movement toward and from said work support, means on said work support for successively supporting a series of spaced portions on a work piece during a grinding operation including a separate steady rest for each portion, a single actuating means for said steady rests, a calipering device movable toward and from operative position relative to the portion to be ground, a timing mechanism and means for starting same at a predetermined point in the grinding operation and means actuated by said timer in cooperation with the movement of said calipering device, for causing said actuating means to move the steady rest corresponding to the portion being ground into work supporting position.

9. A grinding machine including a bed, a work support and a grinding wheel support slidably mounted thereon for movement toward and from said work support, means for successively supporting a series of spaced portions on a work piece during a grinding operation including a separate steady rest for each portion, a calipering device movable toward and from operative position relative to the portion to be ground, a timing mechanism and means for starting same at a predetermined point in the grinding operation and means actuated by said timer in cooperation with the movement of said calipering device for moving said grinding wheel support.

10. In a machine tool, a plurality of steady rests, one for each of a series of spaced portions of a work piece, each rest comprising a base member, a work engaging and supporting member movably mounted thereon for movement toward and from operative position, a positive stop in the path of movement of said work engaging member for locating said member in finished size position, power means including a motor common to all supports for successively moving each of said support members toward and from its respective stop and means for adjusting each of said work engaging members separately to the finished size of the particular portion to be supported.

11. In a machine tool, a plurality of steady rests, one for each of a series of spaced portions of a work piece, each rest comprising a base member, a work engaging and supporting member movably mounted thereon for movement toward and from operative position, a positive stop in the path of movement of said work engaging member for locating said member in finished size position, power means common to all supports for moving said support member in the direction of said stop, means to actuate said power means first with fluid under a given pressure and means operable as said rest engages the work to switch to a supply of fluid at a different pressure.

12. In a grinding machine, a bed, a work support and a grinding wheel support slidably mounted thereon, work rests on said work support, a work rest actuating device on said bed, a work rest engaging member on said device out of contact with work rest when retracted, means on each of said rests for engagement by said member and means for effecting positive engagement between said parts during withdrawal thereof from work supporting position.

13. In a metal working machine, a work support, means for clamping a work piece in said support, a cutting tool, movable toward and away from said work support, power means for actuating said clamping means and said cutting tool, a main power supply for the machine, master control means for stopping said machine including means for controlling the power means for said cutting tool to move said tool to inoperative position, and additional control means actuated by said movement of said cutting tool for delaying the stopping of said main power supply until said tool is withdrawn.

14. In a metal working machine, a work support, means for clamping a work piece in said support, a cutting tool movable toward and away from said work support, power means for actuating said cutting tool, additional power operated mechanisms in said machine including work drive means, hydraulic pumps, and tool rotating means, a main power supply for the machine, master control means actuated either manually or under certain predetermined conditions by any of said power operated mechanisms for stopping all of said mechanisms except said pump including means for controlling the power means for said cutting tool to move said tool to inoperative position, and additional control means actuated in response to said movement of said cutting tool for cutting off said main power supply.

15. In a metal working machine, a work carriage, means for rotatably supporting a work piece thereon, a cutting tool movable toward and away from said work support, power means for actuating said work supporting means and said cutting tool including a motor-driven pump and hydraulic motor for said supporting means and said cutting tool, means including a valve operable upon failure of said work supporting means to support said work piece, to direct fluid to move said cutting tool to inoperative position.

16. In a machine tool, a bed, a work support, a tool support and a steady rest all movably mounted on said bed, means for causing relative transverse and longitudinal movements between said work support, and said steady rest and tool support, a control lever for said movements and means to prevent operation of said control lever to cause said longitudinal movement while said tool and said steady rest are in operative position including a plunger for limiting the movement of said lever, and means operable upon withdrawal of said steady rest for withdrawing said plunger to inoperative position.

17. In a grinding machine, a work support, a wheel support, a grinding wheel rotatably mounted thereon, means to effect relative transverse movement between said supports including a hydraulic motor and pumps for supplying fluid under pressure for operating said motor, a back rest for supporting a work piece during a grinding operation, means for performing a part of said grinding operation without the back rest and means operable upon movement of said rest into operative position for changing the rate of said transverse movement to a slower rate.

18. In a grinding machine, a work support, a wheel support, a grinding wheel rotatably mounted thereon, means to effect relative transverse movement between said supports including a hydraulic motor and pumps for supplying fluid under pressure for operating said motor, a plurality of outlets from each of said pumps, check valves in some of said outlets, means for applying a higher pressure to hold said check valves closed and means operable in response to change in size of a work piece for diverting said higher pressure and permitting fluid to pass through certain of said check valves whereby to adjust the combined output of said pumps.

19. A machine for grinding axially spaced portions on a work piece including a bed, a work support slidably mounted on said bed, a grinding wheel support slidably mounted on said bed for movement toward and away from said work support, means for effecting movement of said grinding wheel support toward said work support at a rapid rate, means for reducing said rapid movement to a movement suitable for effecting a rough grinding operation, means separate from said rapid feed means for effecting said movement at a slow feed rate, a timing mechanism, means for stopping said rough grinding movement of the wheel support and starting said timer to permit a grinding operation without feed for a predetermined interval, a caliper device movable toward and from operative position relative to the portion to be ground, and means actuated jointly by movement of said caliper and said timer to work engaging position at the end of said predetermined interval for [initiating] *resuming* operation of said slow feed means.

20. A grinding machine including a bed, a work support and a grinding wheel support slidably mounted thereon for movement toward and from said work support, a calipering device movable toward and from operative position relative to the portion to be ground, a timing mechanism and means for starting same at a predetermined point in the grinding operation, and means actuated by said timer in cooperation with the movement of said calipering device into work engaging position for initiating movement of said grinding wheel support.

21. In a metal working machine, a work support, a cutting tool movable toward and away from said work support, power means for actuating said cutting tool, additional power-operated means including a work drive mechanism and hydraulic pumps, a main power supply for the machine, master control means actuated either manually or in response to failure of any of said power-operated mechanisms to function properly for stopping said machine, including means for controlling the power means for said cutting tool to stop all of said power-operated mechanisms except said pump, said pump serving to supply fluid to move said tool to inoperative position, and additional control means actuated in response to said movement of said cutting tool for stopping said pump.

22. In a crank grinding machine, a bed, a grinding wheel support slidably mounted thereon, a grinding wheel rotatably mounted in said support, means for effecting a rapid feeding movement of said grinding wheel support to place said grinding wheel in operative position, means to reduce said rapid feeding movement to a feed suitable to grind the side walls of a crankpin, means operable at the end of the rapid feed movement for initiating a slower feed movement for truing the crankpin, means for stopping said truing feed after a predetermined movement while continuing the grinding operation until stress in the crank is relieved, a caliper mounted for movement toward and away from operative engagement with the work, means for resuming said feeding movement after a predetermined interval and at a slower rate, providing said caliper has been moved to operative position, means for effecting successive reductions in the feed rate in response to a change in size of the work until a predetermined size is reached which is just short of the finished size, and means to continue the grinding operation without feed until finish size is reached.

23. In a grinding machine, a work support, a wheel support, a grinding wheel rotatably mounted thereon, means to effect relative transverse movement between said supports including a hydraulic motor and differential pumps for supplying fluid under pressure for operating said motor, a back rest movably mounted on the work support for supporting a work piece during a grinding operation and a hydraulic motor for moving said rest, means for temporarily stopping said transverse movement of said rest into operative position for changing the rate of said transverse movement to a slower rate including a pressure operated valve, actuated at a predetermined point in the movement of said back rest for changing the connections between said pumps and said hydraulic motor.

24. In a grinding machine, a work support, a wheel support, a grinding wheel rotatably mounted thereon, means to effect relative transverse movement between said supports including a hydraulic motor and differential pumps for supplying fluid under pressure for operating said motor, a back rest movably mounted on the work support for supporting a work piece during a grinding operation and a hydraulic motor for moving same, means for temporarily stopping said transverse movement with said back rest in inoperative position, and means including a pressure operated valve operable in response to movement of said rest into operative position for changing the rate of said transverse movement to a slower rate, and connections between said valve and said back rest for actuating said valve to change the flow of fluid between said pumps and said hydraulic motor.

25. In a grinding machine, a work support, a wheel support, a grinding wheel rotatably mounted thereon, means for effecting relative transverse movement between said supports including a hydraulic motor, differential pumps for supplying fluid under pressure for operating said motor, a pressure operated valve for controlling the supply of fluid from said pumps to said motor, a back rest for supporting the work piece during the grinding operation, a piston and cylinder for actuating said back rest and means for actuating said pressure operated valve at a predetermined point in the movement of said back rest, comprising a fluid conduit connecting said back rest cylinder and said valve.

*26. A machine including a bed, a work support slidably mounted on said bed, a grinding wheel support slidably mounted on said bed for movement toward and away from said work support, means for effecting movement of said grinding wheel support toward said work support at a rapid rate, means for reducing said rapid movement to a movement suitable for effecting a rough grinding operation, means separate from said rapid feed means for effecting said movement at a slow feed rate, a timing mechanism, means for automatically stopping said rough grinding movement of the wheel support and starting said timing mechanism to permit a grinding operation without feed for a predetermined interval, and means actuated by said timing mechanism at the end of said predetermined interval for resuming operation of said slow feed means for a finish grinding operation.*

*27. In a grinding machine, a bed, a grinding wheel support slidably mounted thereon, a grinding wheel rotatably mounted in said support, means for effecting a rapid feeding movement of said grinding wheel support to place said grinding wheel in operative position, means operable at the end of the rapid feed movement for initiating a slower feed movement for truing the workpiece, means for automatically stopping said truing feed after a predetermined movement while continuing the grinding operation until stress in the work is relieved, and means for automatically resuming said feeding movement after a predetermined interval and at a predetermined rate.*

*28. In a grinding machine, a bed, a grinding wheel support slidably mounted thereon, a grinding wheel rotatably mounted in said support, a work support on said bed, means for rotatably supporting a workpiece thereon, means for effecting a relative feeding movement between said supports to perform a rough grinding operation for truing the workpiece, means for automatically stopping said truing feed after a predetermined movement while continuing the grinding operation until stress in the workpiece is relieved and means for automatically resuming said feeding movement after a predetermined interval.*

References Cited in the file of this patent or the original patent

UNITED STATES PATENTS

| | | |
|---|---|---|
| 1,045,876 | Norton | Dec. 3, 1912 |
| 1,925,911 | Steiner | Sept. 5, 1933 |
| 2,102,518 | Johnson | Dec. 14, 1937 |
| 2,141,596 | Crompton | Dec. 27, 1938 |
| 2,167,311 | Postma | July 25, 1939 |
| 2,267,391 | Astrowski | Dec. 23, 1941 |
| 2,297,654 | Johnson | Sept. 29, 1942 |
| 2,322,727 | Cole | June 22, 1943 |
| 2,375,737 | Silven | May 8, 1945 |
| 2,419,133 | Garside | Apr. 15, 1947 |
| 2,435,059 | Thompson | Jan. 27, 1948 |
| 2,478,562 | Binns | Aug. 9, 1949 |

FOREIGN PATENTS

| | | |
|---|---|---|
| 371,425 | Great Britain | Apr. 19, 1932 |
| 523,199 | Great Britain | July 9, 1940 |